US009026179B2

(12) United States Patent
Williams

(10) Patent No.: US 9,026,179 B2
(45) Date of Patent: May 5, 2015

(54) DEVICES WITH DISPLAYS AND RELATED METHODS INVOLVING LIGHT SENSING WITH PHOTOVOLTAIC ARRAYS

(75) Inventor: Rodney Owen Williams, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 412 days.

(21) Appl. No.: 13/419,200

(22) Filed: Mar. 13, 2012

(65) Prior Publication Data

US 2013/0065647 A1    Mar. 14, 2013

Related U.S. Application Data

(60) Provisional application No. 61/534,715, filed on Sep. 14, 2011.

(51) Int. Cl.
H04M 1/00 (2006.01)
H04B 1/38 (2006.01)
G06F 3/042 (2006.01)
G06F 3/041 (2006.01)

(52) U.S. Cl.
CPC ............... *G06F 3/042* (2013.01); *G06F 3/0416* (2013.01); *G09G 2320/0261* (2013.01); *G09G 2340/04* (2013.01); *G09G 2354/00* (2013.01)

(58) Field of Classification Search
CPC ................ H04M 1/72583; H04M 1/72522
USPC .............. 455/566, 550.1, 574, 90.1, 567, 95; 715/808; 315/158; 359/601
See application file for complete search history.

(56) References Cited

U.S. PATENT DOCUMENTS

| 6,858,791 | B2 | 2/2005 | Erban | |
| 7,825,891 | B2 | 11/2010 | Yao et al. | |
| 8,130,440 | B2 | 3/2012 | Kothari et al. | |
| 8,547,504 | B2 * | 10/2013 | Guo et al. | 349/96 |
| 2009/0237371 | A1 * | 9/2009 | Kim et al. | 345/173 |
| 2010/0284055 | A1 * | 11/2010 | Kothari et al. | 359/291 |
| 2011/0219333 | A1 * | 9/2011 | Park | 715/808 |
| 2012/0186623 | A1 * | 7/2012 | Bulovic et al. | 136/244 |
| 2013/0063493 | A1 * | 3/2013 | House | 345/660 |

FOREIGN PATENT DOCUMENTS

| CN | 101828146 A | 9/2010 |
| TW | M345293 U | 11/2008 |

OTHER PUBLICATIONS

Taiwan Office Action dated Apr. 15, 2014.
Taiwan Office Action dated Sep. 10, 2014.
English translation of abstract of TW M345293 (published Nov. 21, 2008).

* cited by examiner

*Primary Examiner* — John J Lee
(74) *Attorney, Agent, or Firm* — McClure, Qualey & Rodack, LLP

(57) ABSTRACT

Devices with displays and related methods involving light sensing with photovoltaic arrays are provided. In this regard, a representative device includes: a display; a processing device operative to drive the display; and a photovoltaic array positioned in an overlying relationship with at least a portion of the display, the photovoltaic array being operative to sense light incident thereupon such that the processing device selectively alters light emitted by the display responsive to the incident light sensed by the photovoltaic array.

16 Claims, 3 Drawing Sheets

DEVICES WITH DISPLAYS AND RELATED METHODS INVOLVING LIGHT SENSING WITH PHOTOVOLTAIC ARRAYS

CROSS-REFERENCE TO RELATED APPLICATIONS

This application is a utility application that claims priority to U.S. Provisional Patent Application entitled, "Photovoltaic Film Application", having Ser. No. 61/534,715, filed Sep. 15, 2011, which is entirely incorporated herein by reference.

TECHNICAL FIELD

The present disclosure generally relates to devices with displays.

BACKGROUND

Over the years, portable electronic devices such as smartphones and handheld games have become prevalent. Some of these devices are known to incorporate ambient light sensors, which typically are mounted to printed circuit boards and include light guides or lenses for exposing the sensors to ambient light. Unfortunately, the light guides and lenses can tend to negatively impact the cost of the devices and limit the placement and/or configuration of various device features. For instance, a sensor window typically must be included for mounting of a lens, which can restrict the placement of other components.

SUMMARY

Devices with displays and related methods involving light sensing with photovoltaic arrays are provided. Briefly described, one embodiment, among others, is a device comprising: a display; a processing device operative to drive the display; and a photovoltaic array positioned in an overlying relationship with at least a portion of the display, the photovoltaic array being operative to sense light incident thereupon such that the processing device selectively alters light emitted by the display responsive to the incident light sensed by the photovoltaic array.

Another embodiment is a method for operating a mobile device comprising: sensing intensity of light using a photovoltaic array of a mobile device; and altering operation of the mobile device based, at least in part, on the intensity sensed.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
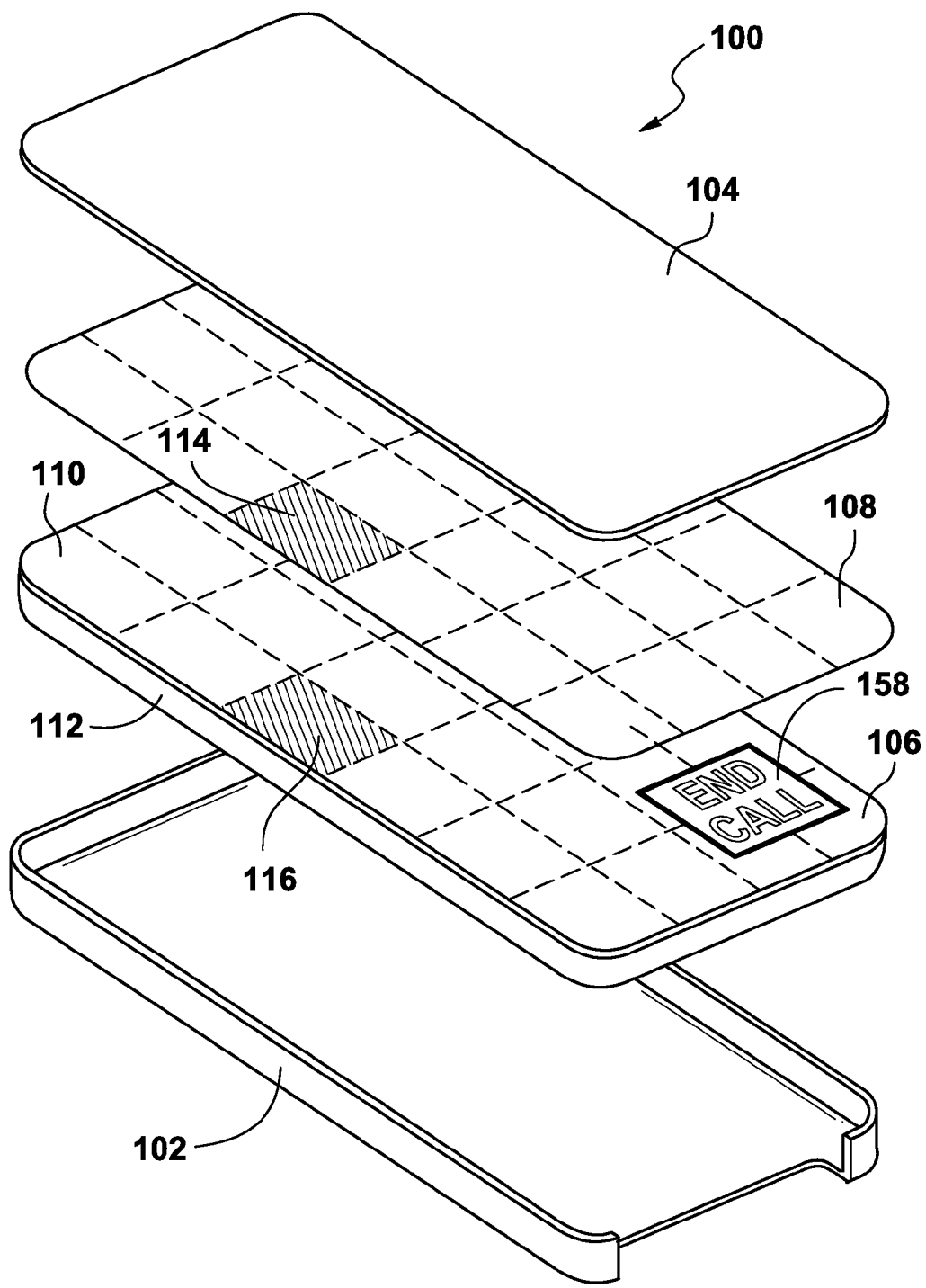
FIG. 1 is a partially-exploded, schematic view of an example embodiment of a device.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

Devices with displays and related methods involving light sensing with photovoltaic arrays are provided. In some embodiments, such a device (e.g., a mobile phone, a gaming device, etc.) incorporates a transparent photovoltaic array that is positioned over a display of the device. By positioning the photovoltaic array over the display device so that a user of the device may view images displayed by the display through the array, other surfaces of the device (e.g., an exterior portion of the housing) need not be used for mounting the array.

In addition to being able to provide power for the device, the photovoltaic array may function as a light sensor. For instance, responsive to the photovoltaic array sensing an increase in ambient light, the device may increase the light output of the display in order to provide improved readability of the display. In some embodiments, an additional (i.e., dedicated) light sensor is not provided on the device.

Additionally or alternatively, a device may incorporate provisioning for emitting light (e.g., light not in the visible spectrum), which may be detected by the photovoltaic array. Such a device may be configured to alter a device function responsive to sensing of the emitted light that is reflected back to the photovoltaic array. Notably, the sensing of reflected light may indicate that the user is close to the display of the device as may occur during a phone call when the user's face often contacts the display. Responsive to sensing the reflected light, the device may alter operations (e.g., at least one function) of the device. For instance, the device may temporarily inactivate an "end call" actuator of the display device so that contact of actuator by the user does not inadvertently end a phone call.

In this regard, FIG. 1 is a partially-exploded, schematic view of an example embodiment of a device. As shown in FIG. 1, device 100 is configured as a mobile phone that incorporates a housing 102, a cover, 104, a display 106 and a photovoltaic array 108. The housing and cover define an interior in which the various other components of the device (some of which are not depicted) are located. The display (e.g., a liquid crystal display) includes a display side 110 and a backlight module 112, which is provided as a source of emitted light for the display if the technology requires.

In this embodiment, the photovoltaic array is provided as a transparent layer that is positioned between the display and the cover. The array is positioned in an overlying relationship with at least a portion of the display and is operative to sense light incident thereupon. Responsive to the incident light, the array generates an electrical signal, the strength of which corresponds to the intensity of the incident light. The electrical signal is used (either directly or indirectly) to provide a corresponding input so that an onboard processing device (not shown in FIG. 1) may selectively alter operation of the device. By way of example, responsive to the amount of incident light sensed at the photovoltaic array, the processing device may alter the amount of light emitted by the display to improve readability. Notably, electrical power produced by the photovoltaic array also may be used for supplying additional power to the device.

Further, the photovoltaic array of FIG. 1 exhibits zones (e.g. zone 114), each of which corresponds to a different physical region of the array. These zones are associated with corresponding zones of the display (e.g., zone 116). In some embodiments, light emitted by the display is selectively altered on a per zone basis responsive to the incident light sensed by the photovoltaic array. By way of example, if an increase in intensity of light is sensed at zone 114 of the array, the intensity of light emitted by the display may be correspondingly altered at zone 116.

Figure 2:
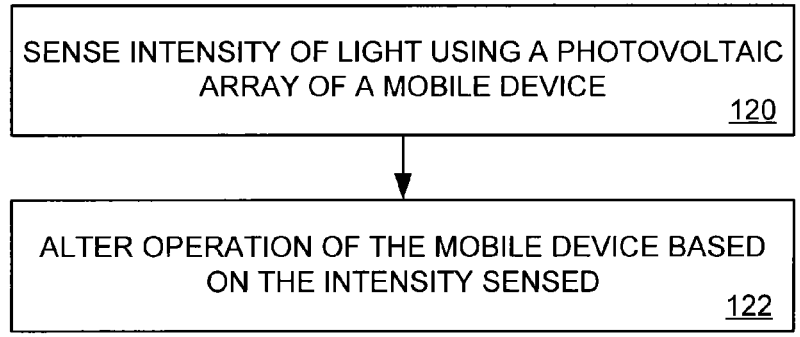
FIG. 2 is a flowchart depicting an example embodiment of a method for operating a mobile device.

FIG. 2 is a flowchart depicting an example embodiment of a method for operating a mobile device such as may be performed by device 100, for example. As shown in FIG. 2, the method involves sensing intensity of light using a photovoltaic array of a mobile device (block 120). Then, in block 122, operation of the mobile device is altered based, at least in part, on the intensity of the light sensed at the array.

Figure 3:
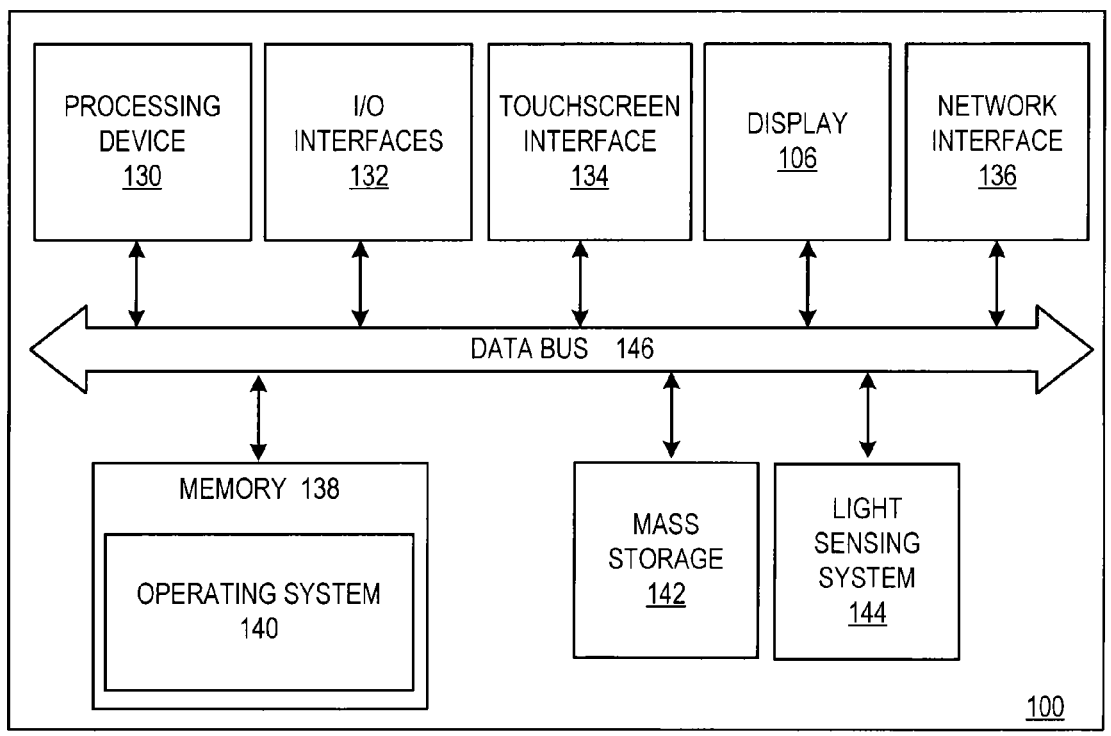
FIG. 3 is a schematic diagram of the embodiment of FIG. 1.

FIG. 3 is a schematic diagram of device 100. As described earlier, device is configured as a mobile phone (e.g., a smartphone) but the concepts described herein may also be embodied in any one of a wide variety of wired and/or wireless devices that incorporate displays.

As shown in FIG. 3, device 100 includes a processing device (processor) 130, input/output interfaces 132, display 106, a touchscreen interface 134, a network interface 136, a memory 138, an operating system 140, a mass storage 142 and a light sensing system 144, which includes a photovoltaic array (108 of FIG. 1), with each communicating across a local data bus 146.

The processing device may include a custom made or commercially available processor, a central processing unit (CPU) or an auxiliary processor among several processors associated with the mobile device, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory may include any one of a combination of volatile memory elements (e.g., random-access memory (RAM, such as DRAM, and SRAM, etc.)) and nonvolatile memory elements. The memory typically comprises native operating system 140, one or more native applications, emulation systems, or emulated applications for any of a variety of operating systems and/or emulated hardware platforms, emulated operating systems, etc. For example, the applications may include application specific software which may comprise some or all the components of device 100. In accordance with such embodiments, the components are stored in memory and executed by the processing device.

The touchscreen interface is configured to detect contact within the display area of the display and provides such functionality as on-screen buttons, menus, keyboards, etc. that allows users to navigate user interfaces by touch.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 3, the network interface device comprises various components used to transmit and/or receive data over a networked environment. When such components are embodied as an application, the one or more components may be stored on a non-transitory computer-readable medium and executed by the processing device.

The light sensing system, which may include components in addition to the photovoltaic array (e.g., a power conditioning circuit), is configured to sense an intensity of light incident upon the photovoltaic array and provide a corresponding input for use by the device. By way of example, the light sensing system may be configured to receive a raw electrical signal generated by the array and, responsive thereto, provide an appropriately conditioned data signal for use by the processing device that contains information corresponding to the light sensed.

Figure 4:
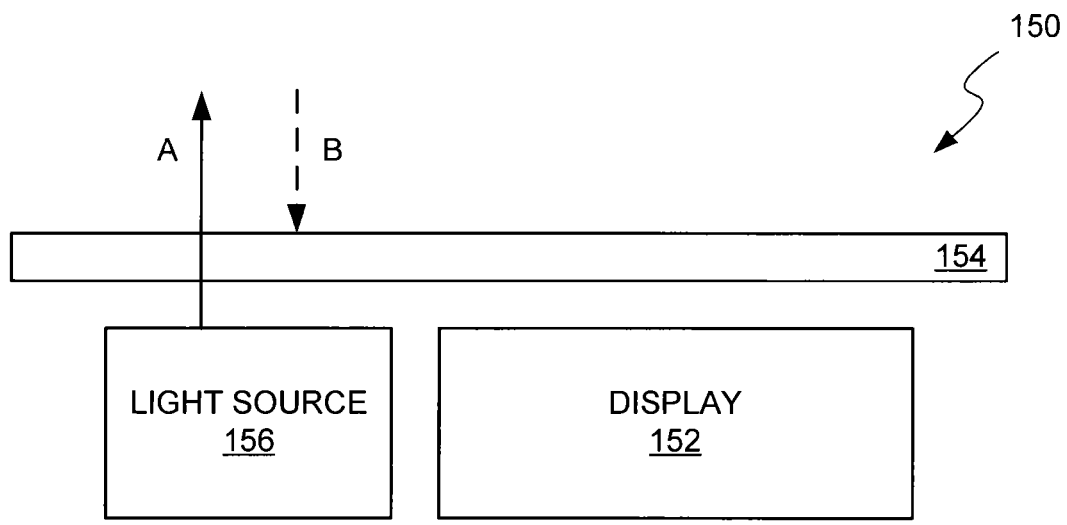
FIG. 4 is a schematic diagram of a portion of another example embodiment of a device.

FIG. 4 is a schematic diagram of a portion of another example embodiment of a device. As shown in FIG. 4, device 150 includes a display 152, a photovoltaic array 154 and a light source 156. In this embodiment, the photovoltaic array extends beyond an edge of the display such that the array is in an overlying relationship with at least a portion of a light source. The light source emits light (e.g., intermittently emits the light), which may be of a predetermined frequency or range of frequencies (e.g., infrared light), and which may be of visible and/or non-visible spectra. For instance, the emitted light may be of a predetermined frequency that is detectable by the photovoltaic array, such as when the light is reflected back toward the device. Note that in FIG. 4, arrow A represents light emitted from the light source and arrow B represents light reflected back to the array.

In an embodiment so configured, operation of the mobile device may be selectively adjusted responsive to sensing of the light reflected back to the array. For instance, if the intensity of the light sensed at the photovoltaic array indicates that a threshold amount of the emitted light is being reflected back to the array, this may be an indication that the user's face is close to the display. This may occur when the user is using the device during a phone call. Responsive to sensing the reflected light, which may be corroborated with other indications (e.g., a phone call is currently taking place), the device may perform one or more of various functions, such as disabling an "end call" graphical actuator of the display (e.g., actuator 158 of FIG. 1) to reduce the likelihood of inadvertent hang-up due to contact of the actuator with the user's face. Similarly, the actuator may be reactivated responsive to sensing that the amount of light reflected back to the array no longer corresponds to the predetermined threshold.

Figure 5:
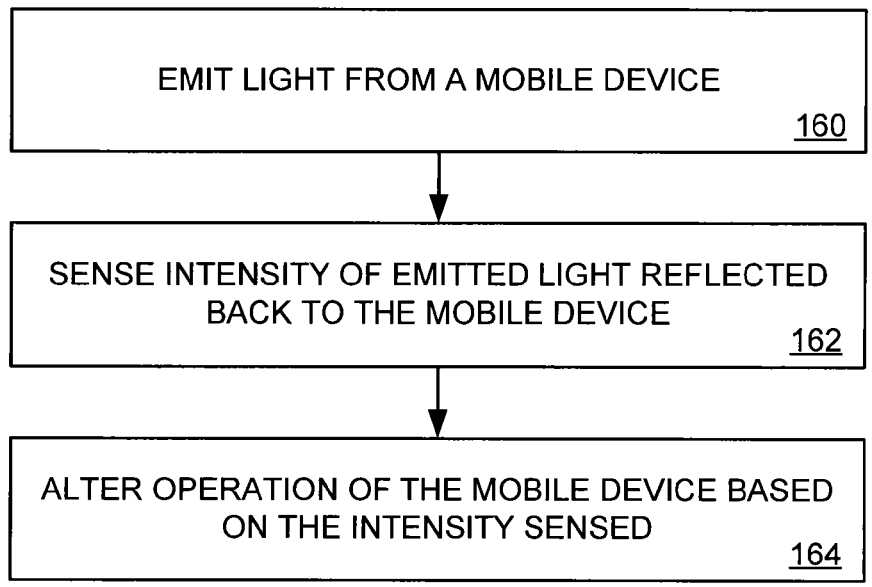
FIG. 5 is a flowchart depicting another example embodiment of a method for operating a mobile device.

FIG. 5 is a flowchart depicting another example embodiment of a method for operating a mobile device. As shown in FIG. 5, the method includes emitting light from a mobile device (block 160). In some embodiments, emitting of the light may be performed by a dedicated light source and/or a display of the device. In block 162, the intensity of the emitted light that is reflected back to the mobile device is sensed. Then, as shown in block 164, operation of the mobile device may be adjusted, based at least in part, on the sensed intensity of the reflected light. As mentioned before, this intensity may be related to various factors, such as the proximity of the user.

If embodied in software, it should be noted that each block depicted in the flowcharts may represent a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as device 100 shown in FIG. 3. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A device comprising:
   a display for displaying images;
   a processing unit operative to drive the display;
   a photovoltaic array positioned in an overlying relationship on at least a portion of the display, the photovoltaic array being operative to sense light incident thereupon such that the processing unit selectively alters light emitted by the display responsive to the incident light sensed by the photovoltaic array; and
   a transparent cover operative to protect the display;
   wherein the photovoltaic array is positioned beneath at least a portion of the transparent cover.

2. The device of claim 1, wherein the photovoltaic array is configured as a transparent layer.

3. The device of claim 1, wherein the photovoltaic array is further operative to provide electrical power for powering the device.

4. The device of claim 1, wherein:
   the device further comprises a light source operative to emit light of a predetermined frequency; and
   the photovoltaic array is operative to sense the predetermined frequency of light such that operation of the mobile device is selectively adjusted responsive to the light sensed of the predetermined frequency.

5. The device of claim 4, wherein the device is a mobile phone.

6. The device of claim 5, wherein the device is configured to disable an end call graphical actuator of the display device responsive to detecting that an amount of the light sensed of the predetermined frequency corresponds to a first threshold.

7. The device of claim 4, wherein the light source is operative to emit light from the non-visible spectrum.

8. The device of claim 4, wherein:
   the device further comprises a cover operative to protect the display; and
   the light source is positioned such that the light emitted therefrom is directed through the cover.

9. The mobile device of claim 1, wherein:
   the photovoltaic array has zones corresponding to zones of the display; and
   light emitted by the display is selectively altered on a per zone basis responsive to the incident light sensed by the photovoltaic array.

10. A device comprising:
    a display for displaying images;
    a processing unit operative to drive the display;
    a photovoltaic array positioned in an overlying relationship on at least a portion of the display, the photovoltaic array being operative to sense light incident thereupon such that the processing unit selectively alters light emitted by the display responsive to the incident light sensed by the photovoltaic array, wherein:
    the device further comprises a transparent cover operative to protect the display; and
    the photovoltaic array is positioned between at least a portion of the transparent cover and at least a portion of the display.

11. A method for operating a mobile device having a display for displaying images and a photovoltaic array positioned on at least a portion of the display comprising:
    sensing intensity of light from the non-visible spectrum using the photovoltaic array of the mobile device;
    altering light output of a backlight module of the mobile device based, at least in part, on the intensity sensed, and preventing the user from inadvertently actuating a function on the display;
    displaying images from the mobile device through the photovoltaic array.

12. The method of claim 11, wherein altering operation further comprises altering light output of a display of the mobile device.

13. The method of claim 11, wherein:
    the sensing is performed by a photovoltaic array of the mobile device; and
    the method further comprises providing at least a portion of the power consumed by the mobile device with the photovoltaic array.

14. The method of claim 11, wherein, in sensing the intensity of light, the light being sensed is light emitted from the mobile device.

15. The method of claim 14, wherein the light being sensed comprises light reflected by the user of the mobile device.

16. The method of claim 11, wherein:
    the mobile device is a mobile phone; and
    altering operation further comprises preventing the user from ending a call on the phone by inadvertent contact with the display.

\* \* \* \* \*